(12) United States Patent
Kerns et al.

(10) Patent No.: US 8,539,914 B2
(45) Date of Patent: Sep. 24, 2013

(54) METHOD FOR OPERATING AN ENGINE WITH A FUEL REFORMER

(75) Inventors: James Michael Kerns, Trenton, MI (US); Thomas G. Leone, Ypsilanti, MI (US); Michael Howard Shelby, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 277 days.

(21) Appl. No.: 12/756,858

(22) Filed: Apr. 8, 2010

(65) Prior Publication Data

US 2011/0132306 A1    Jun. 9, 2011

(51) Int. Cl.
*F02G 5/00* (2006.01)
*F02B 43/00* (2006.01)
*F02B 43/08* (2006.01)

(52) U.S. Cl.
USPC .................. 123/3; 123/1 A; 123/543

(58) Field of Classification Search
USPC ............... 123/549, 1 A, 3, 568.15, 682, 478, 123/445, 306, 575; 477/100; 701/104, 105; 250/343, 344, 334.12
See application file for complete search history.

(56) References Cited

U.S. PATENT DOCUMENTS

| | | | |
|---|---|---|---|
| 4,170,200 A * | 10/1979 | Takeuchi et al. | 123/3 |
| 4,230,072 A * | 10/1980 | Noguchi et al. | 123/1 A |
| 4,391,253 A * | 7/1983 | Ito | 123/406.44 |
| 4,413,594 A * | 11/1983 | Hirota | 123/3 |
| 4,520,764 A * | 6/1985 | Ozawa et al. | 123/3 |
| 4,982,709 A * | 1/1991 | Oota | 123/339.12 |
| 5,090,389 A * | 2/1992 | Oota | 123/685 |
| 5,176,122 A | 1/1993 | Ito | |
| 5,224,452 A | 7/1993 | Tomizawa | |
| 5,372,411 A | 12/1994 | Gerstenmaier et al. | |
| 5,445,019 A | 8/1995 | Glidewell et al. | |
| 5,526,797 A | 6/1996 | Stokes | |
| 5,542,394 A | 8/1996 | Tomisawa | |
| 5,633,458 A | 5/1997 | Pauli et al. | |
| 5,682,864 A | 11/1997 | Shirakawa | |
| 5,740,667 A | 4/1998 | Bhattacharyya et al. | |
| 5,762,366 A | 6/1998 | Faye | |
| 5,857,445 A | 1/1999 | Shimada et al. | |
| 6,024,069 A | 2/2000 | Yoshino | |

(Continued)

FOREIGN PATENT DOCUMENTS

EP    2 048 339 A1    4/2009
JP    60184957 A *    9/1985

(Continued)

OTHER PUBLICATIONS

ISA Korean Intellectual Property Office, International Search Report of PCT/US2011/031092, Nov. 11, 2011, 5 pages.

(Continued)

*Primary Examiner* — Thanh K Truong
*Assistant Examiner* — Tea Holbrook
(74) *Attorney, Agent, or Firm* — Julia Voutyras; Alleman Hall McCoy Russell & Tuttle LLP

(57) ABSTRACT

Methods for operating a flexible fuel engine with a fuel reformer which reforms a fuel into a gaseous fuel reformate are provided. Operating parameters of the fuel reformer and delivery of reformate to the engine are adjusted based on an alcohol content of the fuel.

20 Claims, 4 Drawing Sheets

(56) References Cited

U.S. PATENT DOCUMENTS

| | | | |
|---|---|---|---|
| 6,058,906 A | 5/2000 | Yoshino | |
| 6,088,647 A | 7/2000 | Hemberger et al. | |
| 6,176,215 B1 | 1/2001 | Baur et al. | |
| 6,213,104 B1 | 4/2001 | Ishikirlyama et al. | |
| 6,247,449 B1 | 6/2001 | Persson | |
| 6,318,306 B1 | 11/2001 | Komatsu | |
| 6,334,424 B1 | 1/2002 | Ito | |
| 6,349,702 B1 | 2/2002 | Nishiyama | |
| 6,390,030 B1 | 5/2002 | Isogawa et al. | |
| 6,591,817 B2 | 7/2003 | Deutsch | |
| 6,705,295 B1 | 3/2004 | Tarroux et al. | |
| 6,711,893 B2 | 3/2004 | Ueda et al. | |
| 6,729,301 B2 | 5/2004 | Nakamori et al. | |
| 6,751,543 B2 | 6/2004 | Gras et al. | |
| 6,851,398 B2 | 2/2005 | Taylor, III et al. | |
| 6,964,261 B2 | 11/2005 | Warne et al. | |
| 6,981,472 B2 * | 1/2006 | Bromberg et al. | 123/3 |
| 6,988,481 B2 | 1/2006 | Sen et al. | |
| 6,990,956 B2 | 1/2006 | Niimi | |
| 6,997,142 B2 | 2/2006 | Wakao et al. | |
| 7,047,940 B2 | 5/2006 | Niimi | |
| 7,089,888 B2 | 8/2006 | Mirji | |
| 7,104,244 B2 | 9/2006 | Nishi et al. | |
| 7,159,541 B2 | 1/2007 | Wakao et al. | |
| 7,203,579 B2 | 4/2007 | Yokota et al. | |
| 7,228,841 B2 | 6/2007 | Takemoto et al. | |
| 7,261,065 B2 | 8/2007 | Aimoto et al. | |
| 7,370,609 B2 | 5/2008 | Kamio | |
| 7,448,348 B2 * | 11/2008 | Shinagawa et al. | 123/3 |
| 7,454,898 B2 | 11/2008 | Allgeier et al. | |
| 7,523,744 B2 | 4/2009 | Ayame | |
| 7,530,335 B2 | 5/2009 | Sakurai et al. | |
| 7,568,452 B2 * | 8/2009 | Shimada et al. | 123/3 |
| 7,597,068 B2 * | 10/2009 | Arai et al. | 123/3 |
| 7,770,545 B2 * | 8/2010 | Morgenstern | 123/3 |
| 2001/0003977 A1 | 6/2001 | Hayashi et al. | |
| 2004/0137288 A1 | 7/2004 | Morgenstern | |
| 2004/0139944 A1 | 7/2004 | Nakano et al. | |
| 2005/0126551 A1 * | 6/2005 | Mello et al. | 123/549 |
| 2007/0086934 A1 | 4/2007 | Huber et al. | |
| 2007/0204813 A1 | 9/2007 | Arai et al. | |
| 2007/0215127 A1 * | 9/2007 | Dearth et al. | 123/568.15 |
| 2008/0010993 A1 | 1/2008 | Morgenstern | |
| 2008/0098985 A1 | 5/2008 | Kamio | |
| 2008/0141984 A1 | 6/2008 | Haga | |
| 2008/0221778 A1 | 9/2008 | Kakuho et al. | |
| 2008/0228375 A1 | 9/2008 | Ashida et al. | |
| 2008/0282998 A1 | 11/2008 | Kuzuoka et al. | |
| 2009/0017987 A1 | 1/2009 | Saton et al. | |
| 2009/0030588 A1 | 1/2009 | Yamashita | |
| 2009/0043479 A1 | 2/2009 | Noda et al. | |
| 2009/0065409 A1 | 3/2009 | Kamio et al. | |
| 2009/0071453 A1 | 3/2009 | Stockhausen et al. | |
| 2009/0260419 A1 * | 10/2009 | Maeda et al. | 73/23.32 |
| 2009/0306879 A1 * | 12/2009 | Takubo | 701/104 |
| 2010/0049425 A1 * | 2/2010 | Tashima et al. | 701/109 |
| 2010/0132681 A1 * | 6/2010 | Okazaki et al. | 123/703 |
| 2010/0174470 A1 * | 7/2010 | Bromberg et al. | 701/103 |
| 2010/0212611 A1 * | 8/2010 | Yahagi | 123/3 |
| 2010/0224141 A1 * | 9/2010 | Nakada | 123/3 |
| 2010/0319635 A1 * | 12/2010 | Morgenstern | 123/3 |

FOREIGN PATENT DOCUMENTS

| | | | | |
|---|---|---|---|---|
| JP | 2008031931 A | * | 2/2008 | |
| JP | 2009114873 A | * | 5/2009 | |
| JP | 2009144657 A | * | 7/2009 | |
| JP | 2011153601 A | * | 8/2011 | |

OTHER PUBLICATIONS

Leone, Thomas G., et al., "Method for Operating a Charge Diluted Engine" U.S. Appl. No. 12/756,822, filed Apr. 8, 2010, FGT093217U01, 87 Pgs.

Leone, Thomas G., et al. "Method for Operating and Engine with Variable Charge Density" U.S. Appl. No. 12/756,800, filed Apr. 8, 2010, FGT093217U02, 87 Pgs.

Leone, Thomas G., et al., "Pump Control for Reformate Fuel Storage Tank" U.S. Appl. No. 12/756,827, filed Apr. 8, 2010, FGT093219, 24 Pgs.

Czekala, Michael D., et al., "Ignition Control for Reformate Engine" U.S. Appl. No. 12/756,792, filed Apr. 8, 2010, FGT093220, 32 Pgs.

Pursifull, Ross D., "Fuel Injector Diagnostic for Dual Fuel Engine" U.S. Appl. No. 12/756,838, filed Apr. 8, 2010, FGT093221, 35 Pgs.

Pursifull, Ross D., "Engine Fuel Reformer Monitoring" U.S. Appl. No. 12/756,845, filed Apr. 8, 2010, FGT093222, 37 Pgs.

Gopichandra, Surnilla, et al., "Method for Improving Transient Engine Operation" U.S. Appl. No. 12/756,784, filed Apr. 8, 2010, FGT093223, 77 Pgs.

Leone, Thomas G., "Operating and Engine with Reformate" U.S. Appl. No. 12/756,883, filed Apr. 8, 2010, FGT093224, 48 Pgs.

Leone, Thomas G., et al., "Method for Operating a Vehicle with a Fuel Reformer" U.S. Appl. No. 12/756,892, filed Apr. 8, 2010, FGT093225, 86 Pgs.

Pursifull, Ross D., "Method for Operating an Engine" U.S. Appl. No. 12/756,809, filed Apr. 8, 2010, FGT093226, 87 Pgs.

Pursifull, Ross D., et al., "Selectively Storing Reformate" U.S. Appl. No. 12/756,853, filed Apr. 8, 2010, FGT093229, 33 Pgs.

Leone, Thomas G., "Reformate Control Via Accelerometer" U.S. Appl. No. 12/756,897, filed Apr. 8, 2010, FGT093230, 33 Pgs.

Kamio, Junichi, et al., "Study on HCCI-SI Combustion Using Fuels Containing Ethanol", SAE Technical Paper Series No. 2007-01-4051, Powertrain & Fluid Systems, Conference & Exhibition, Rosemont, IL, Oct. 29-Nov. 1, 2007, 12 Pgs.

Hoffmann, Walter, et al., "A New Approach to Ethanol Utilization: High Efficiency and Low Nox in an Engine Operating on Simulated Reformed Ethanol", SAE Technical Paper Series No. 2008-10-2415, Powertrain, Fuels, & Lubricants Meeting, Rosemont, IL, Oct. 6-9, 2008, 11 Pgs.

Morgenstern, David A., et al., "Low Temperature Reforming of Ethanol over Copper-Plated Randy Nickel: A New Route to Sustainable Hydrogen for Transportation" revised manuscript received May 4, 2005, pp. 9.

Green Car Congress, "Honda Making Significant Progress on HCCI Engine for Hybrid Application" Oct. 28, 2009, http://www.greencarcongress.com/2005/10/honda_making_si.html, 8 Pgs.

* cited by examiner

METHOD FOR OPERATING AN ENGINE WITH A FUEL REFORMER

FIELD

The present description relates to a method for operating an engine with a fuel reformer.

BACKGROUND AND SUMMARY

Fuel reformers can be used to convert alcohol fuels into gaseous fuels (reformates) to fuel an engine. For example, an ethanol reformer can reform ethanol into a reformate gas comprising hydrogen ($H_2$), carbon monoxide (CO), and methane ($CH_4$) for combustion in an engine.

The inventors herein have recognized that engines with fuel reformers may be fueled with a variety of different fuels with varying alcohol content, e.g., flexible fuel engines. For example, a flexible fuel engine may be fueled with ethanol, ethanol-gasoline blends such as E85, E50, etc., or gasoline. In such engines, operation of a fuel reformer may degrade when the alcohol content of the fuel is too low. For example, if a reformer is supplied with a variable alcohol blend from one fuel refill to the next, a significant amount of non-reformed fuel may be output by the reformer.

In one example approach, the above issues can be at least partially addressed by a method for operating an engine, comprising: reforming a fuel into a gaseous fuel including $H_2$ when an alcohol content of the fuel is above a threshold; and not reforming a fuel into a gaseous fuel including $H_2$ when an alcohol content of the fuel is above the threshold.

In another example approach, the above issues can be at least partially addressed by a method for operating an engine with an alcohol reformer which reforms a fuel into a reformate including $H_2$, the method comprising: adjusting an operating condition of the alcohol reformer based on an alcohol content of the fuel.

In this way, operation of a fuel reformer employed by an engine may be tailored based on an alcohol content of a fuel and degradation of fuel reformer operation reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
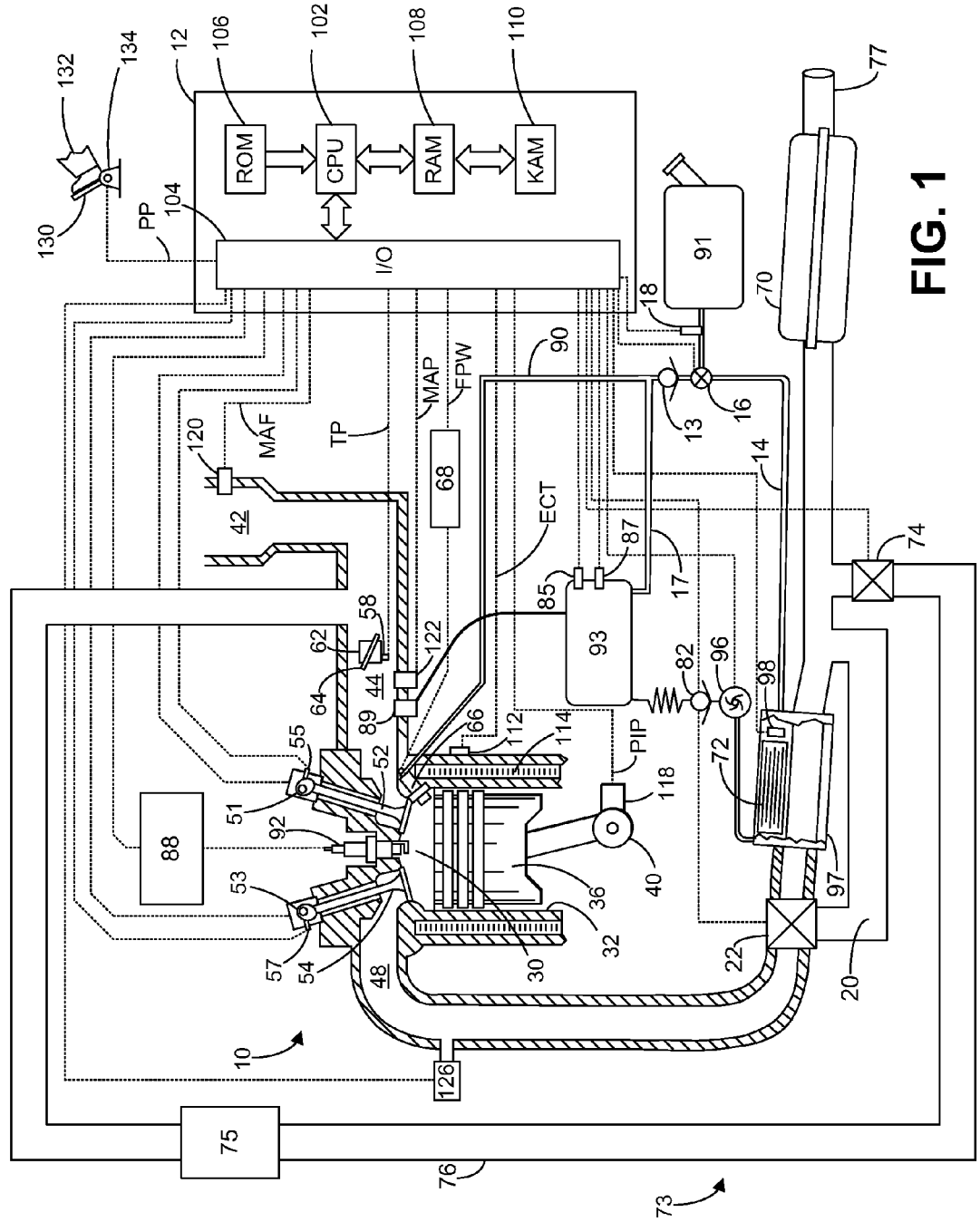
FIG. 1 shows a schematic diagram of an engine with a fuel reformer.

The following description relates to systems and methods for operating an engine with a fuel reformer, a schematic example of which is shown in FIG. 1. Fuel reformers can be used to convert alcohol fuels into gaseous fuels (reformates) to fuel an engine. For example, an ethanol reformer can reform ethanol into a reformate gas comprising hydrogen ($H_2$), carbon monoxide (CO), and methane ($CH_4$) for combustion in an engine.

An engine with a fuel reformer, e.g., an ethanol reformer, may be fueled with a variety of different fuels with varying alcohol content. For example, a flexible fuel engine may be fueled with ethanol, ethanol-gasoline blends such as E85, E50, etc., or gasoline.

At low temperatures, fuels substantially comprising alcohol may lack sufficient vapor pressure to form ignitable mixtures; thus reformate, if available, may be used to assist in engine cold starts. Additionally, reformate may be used to suppress engine knock during high load conditions when an engine is fueled with a fuel substantially comprising alcohol, for example, when the engine RPM is near 1500. Reformate may also be used to decrease emissions following engine cold starts before an emissions control device has been heated sufficiently to become catalytically active.

When a flexible fuel engine is fueled with a fuel substantially comprising gasoline, an amount of reformate used by the engine may be reduced since gasoline may have sufficient vapor pressure for engine cold starts.

However, operation of a fuel reformer may degrade when the alcohol content of the fuel is too low. For example, if a reformer is supplied with an alcohol blend, a significant amount of non-reformed fuel may be output by the reformer.

Thus, when a flexible engine is fueled with a fuel substantially comprising alcohol, the reformer may be activated to generate reformate for delivery to the engine. Additionally, an amount of reformate may be stored for use during a subsequent engine operation. When a flexible fuel engine is fueled with a fuel substantially comprising gasoline, the reformer may not be activated or may produce a reduced amount of reformate. Further, in this case, the engine may correspondingly use a reduced amount of reformate, and adjust other parameter, such as spark retard, to compensate for the lack of, or reduced amount of, reformate.

Figure 2:
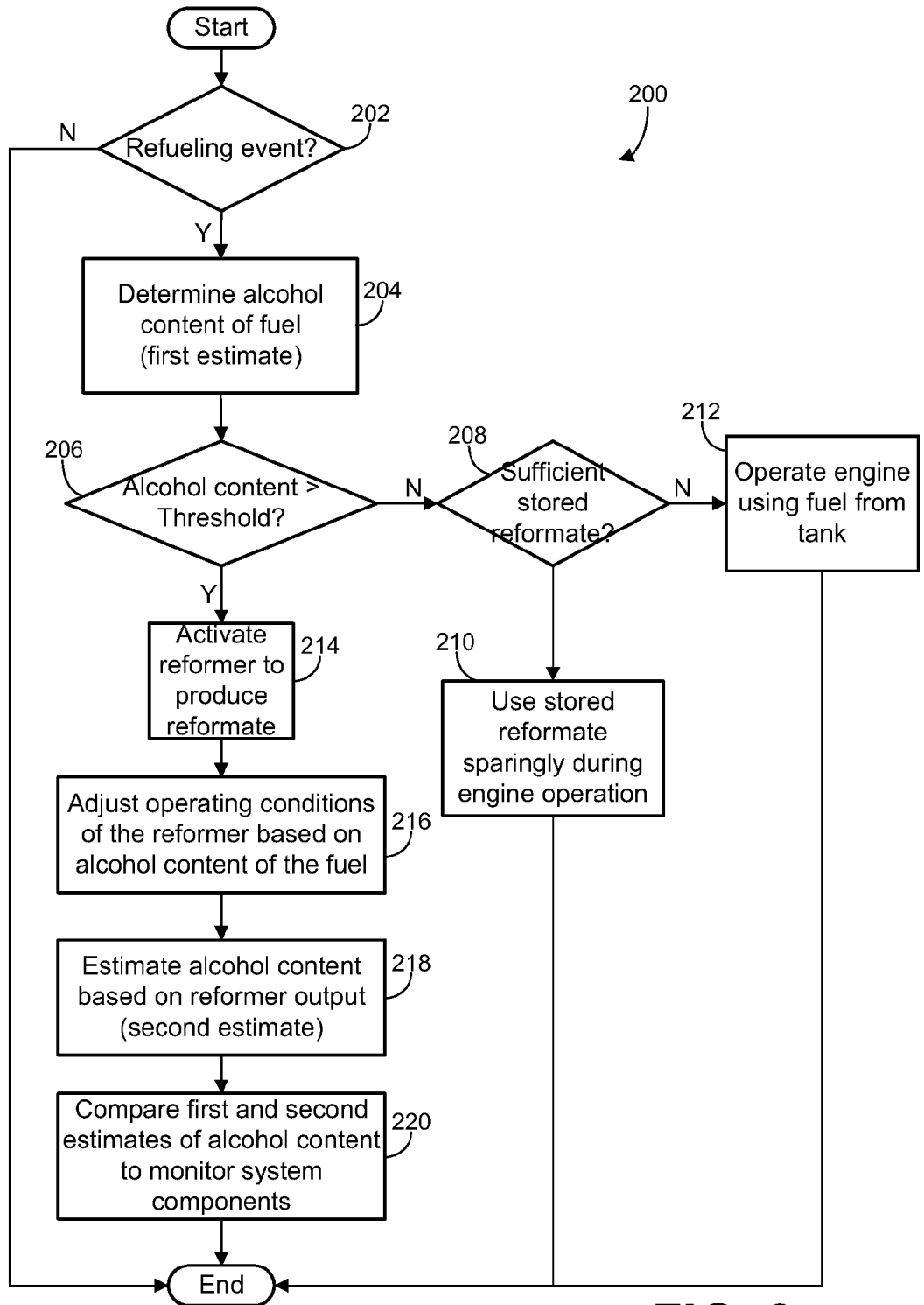
FIG. 2 shows an example method for operating an engine with a fuel reformer.
Figure 3:
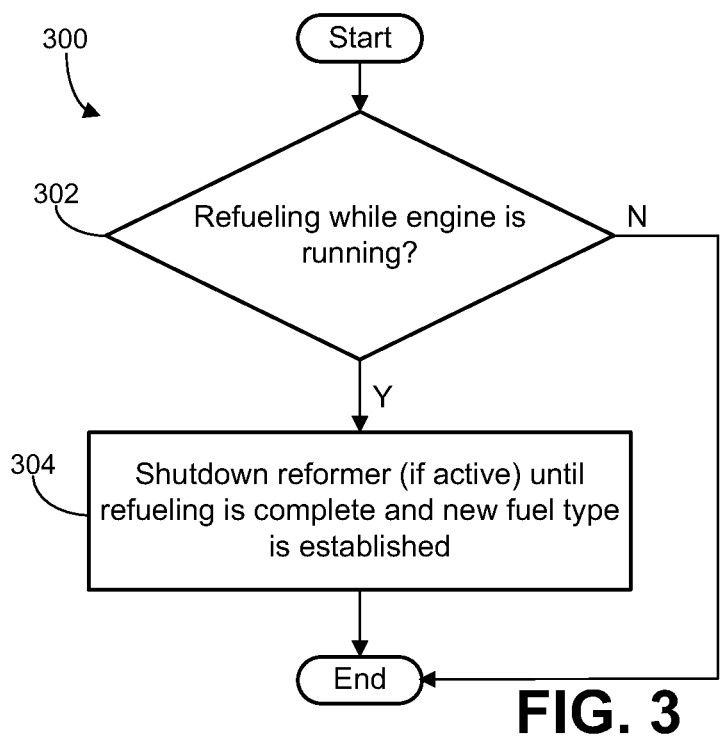
FIG. 3 shows a method for operating an engine with a fuel reformer during a refueling event.
Figure 4:
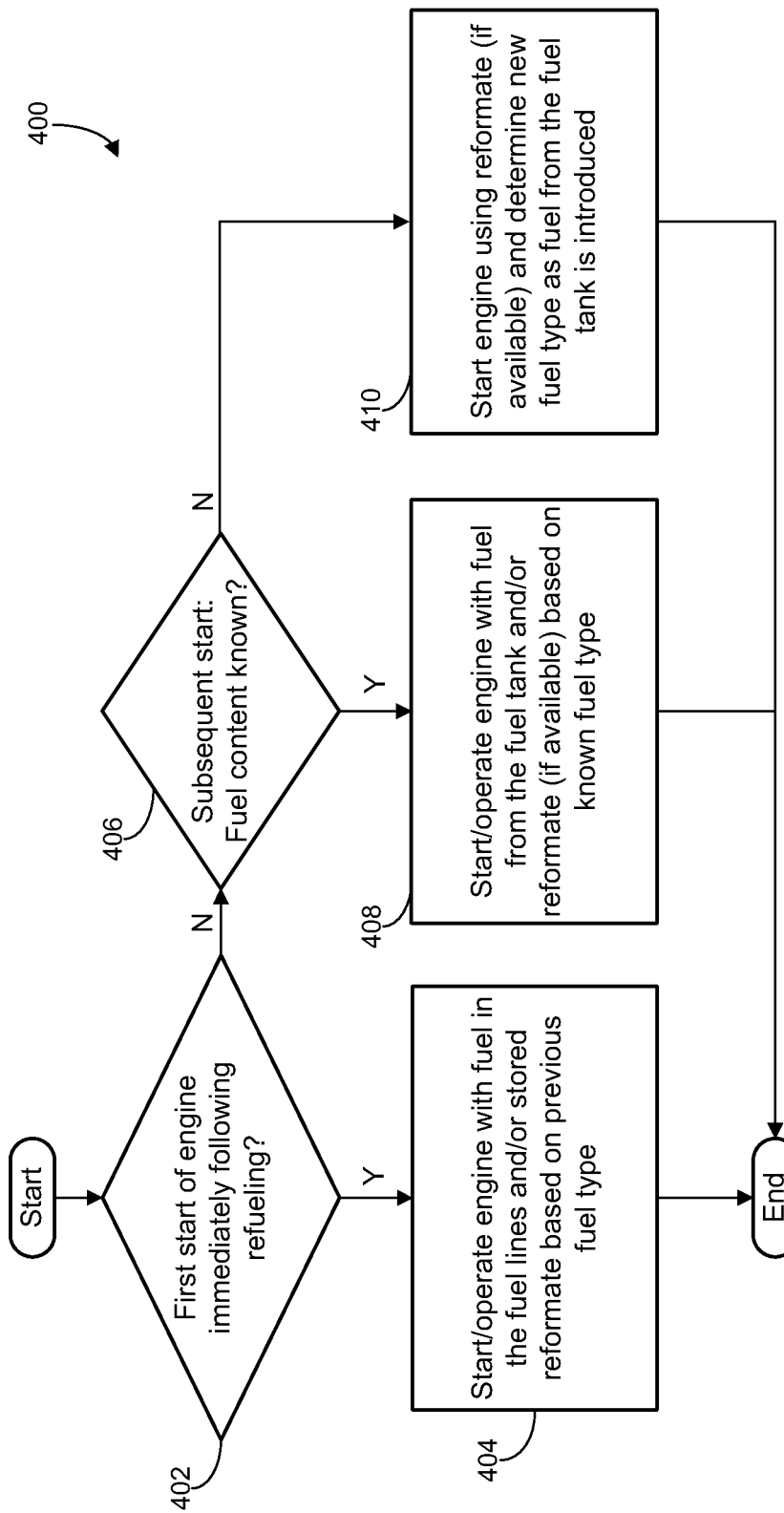
FIG. 4 shows an example method for operating an engine during engine starts following a refueling event with a new fuel.

Various example methods for adjusting operating conditions of an engine with a fuel reformer, e.g., an ethanol reformer, are shown in FIGS. 2-4. For example, following a refueling event with a different fuel alcohol content, the alcohol content of the new fuel may be determined in order to determine if the reformer may be activated to produce reformate. Additionally, reformer operating conditions and an amount of reformate delivered to the engine may be adjusted based on the alcohol content of the new fuel. Further, various estimates of the alcohol content of the fuel may be used to diagnose degradation in engine and reformer system components.

Turning now to FIG. 1, a schematic diagram of one cylinder of multi-cylinder engine 10, which may be included in a propulsion system of an automobile, is shown. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some examples, combustion chamber 30 may include two or more intake valves and/or two or more exhaust valves. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP from a throttle position sensor 58. Intake passage 42 may include a mass air flow sensor 120 and a manifold air pressure sensor 122 for providing respective signals MAF and MAP to controller 12.

A fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. In some embodiments, combustion chamber 30 may alternatively or additionally include a fuel injector arranged in intake passage 44 in a configuration that provides what is known as port injection of fuel into the intake port upstream of combustion chamber 30. Fuel may be delivered to fuel injector 66 by a fuel system including a fuel tank 91, a fuel pump (not shown), a fuel line 90, and a fuel rail (not shown).

A fuel reformer 97 is shown coupled to exhaust passage 48. Fuel reformer 97 is configured to reform fuel supplied by fuel tank 91 via fuel line 14 into a gaseous fuel reformate. For example, when a fuel in fuel tank 91 includes ethanol, fuel reformer 97 may be configured to reform the fuel into a gaseous fuel reformate comprising $H_2$, CO, and $CH_4$. A valve 16 may be positioned in fuel line 14 to divert fuel delivery either to the reformer or to the engine. Additionally a fuel sensor 18 may be disposed in the fuel line to determine the type of fuel used, e.g. following a refueling event. In some examples, a fuel evaporator may be employed to vaporize the fuel supplied to the fuel reformer. Thus, for example, a fuel evaporator may be disposed in fuel line 14 or within the same unit as the fuel reformer.

Fuel reformer 97 includes catalyst 72. In some examples, catalyst 72 may include copper at a surface of a thermally conductive metal supporting structure, e.g., copper-plated Raney nickel. For example, a catalyst may be prepared by depositing copper onto a nickel sponge supporting structure with high surface area.

Reformer 97 may use exhaust heat to drive an endothermic dehydrogenation of alcohol as it passes through the catalyst to promote reformation of alcohol into a gaseous reformate fuel. For example, ethanol may be reformed by reformer 97 into a gaseous reformate fuel comprising $H_2$, CO, and $CH_4$. Thus reformer 97 may be thermally coupled to exhaust passage 48. For example, catalyst 72 of reformer 97 may be thermally coupled to a portion of exhaust conduit 48.

Fuel reformer 97 may include an electrical heater 98 for heating alcohol supplied from fuel tank 91 via fuel conduit 14 for additional temperature control of the fuel reformer. For example, an amount of heat supplied to the reformer may be increased by increasing power of the heater, e.g., increasing current flow through the heater or increasing a resistance of the heater. In some examples, a reformer bypass conduit 20 may be disposed in the exhaust conduit in order to direct exhaust gas away from the reformer, e.g., to control the temperature of the reformer catalyst. Reformer bypass conduit 20 may include a bypass value 22 upstream of reformer 97 to control the amount of exhaust gas in thermal contact with reformer 97.

Gaseous fuel produced by the reformer may be injected to intake manifold 44 by way of a gaseous fuel injector 89. In other examples, gaseous fuel may be directly injected into cylinder 30. Gaseous fuel may be supplied to gaseous fuel injector 89 from a reformate storage tank 93 by way of a pump 96 and a check valve 82. Pump 96 pressurizes gaseous fuel supplied from fuel reformer 97 in storage tank 93. Check valve 82 limits flow of gaseous fuel from storage tank 93 to fuel reformer 97 when the output of pump 96 is at a lower pressure than storage tank 93. In some examples, instead of or in addition to the reformate storage tank, gaseous fuel may be supplied to a fuel cell, e.g., in HEV vehicles.

If fuel reformer 97 is supplied with a blend of fuel including alcohol, a portion of the fuel that is not alcohol may not be reformed, thus may condense in the storage tank. Thus, storage tank 93 may include a drain line 17 coupled to fuel line 90 to direct condensate from the reformate storage tank 93 to the fuel supply line 90. As such a check valve 13 may be positioned upstream of the intersection of the drain line 17 and fuel line 90 so as to prevent condensate from flowing back to the fuel tank. In some examples, condensate from the reformate storage tank 93 may be returned to the fuel tank 91. Drain line 17 may also include a drain control valve (not shown).

Combustion chamber 30 or one or more other combustion chambers of engine 10 may be operated in a compression ignition mode, with or without an ignition spark. Distributorless ignition system 88 provides an ignition spark to combustion chamber 30 via spark plug 92 in response to controller 12.

An exhaust gas sensor 126 is shown coupled to exhaust passage 48 upstream of reformer 97. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor.

An exhaust gas recirculation system (EGR) 73 may be coupled to exhaust passage 48 downstream of reformer 97. The EGR system may include an EGR valve 74 and an EGR cooler 75 disposed along the EGR conduit 76. Fuel reformer 97 may assist in cooling exhaust gas recirculated to the engine via EGR system 73.

An emission control device 70 is coupled to the exhaust passage downstream of reformer 97. In some examples, emission control device 70 may be located upstream of reformer 97. Emission control device 70 can include multiple catalyst bricks, in one example. In another example, multiple emission control devices, each with multiple bricks, can be used. In some examples, emission control device 70 may be a three-way type catalyst. In other examples, example emission control device 70 may include one or a plurality of a diesel oxidation catalyst (DOC), selective catalytic reduction catalyst (SCR), and a diesel particulate filter (DPF). After passing through emission control device 70, exhaust gas is directed to a tailpipe 77.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of fuel reformer tank pressure from pressure sensor 85; a measurement of fuel reformer tank temperature from temperature sensor 87; a measurement of air mass entering the engine from sensor 120; and a measurement of throttle position from sensor 58. Barometric pressure may also be sensed (sensor not shown) for processing by controller 12. In some examples, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof.

Though FIG. 1 shows only one cylinder of a multi-cylinder engine, each cylinder may similarly include its own set of intake/exhaust valves, fuel injector, spark plug, etc. Additionally, though FIG. 1 shows a normally aspirated engine, engine 10 may be turbocharged in some examples.

FIG. 2 shows an example method 200 for operating an engine with a fuel reformer which reforms a fuel containing alcohol into a gaseous fuel reformate, e.g., an ethanol reformer which reforms a fuel containing ethanol into a gaseous fuel reformate comprising $H_2$, CO, and $CH_4$.

At 202, method 200 includes identification of a refueling event. A refueling event may include an increase in a quantity of fuel contained in the fuel tank and/or any change in a type of fuel contained in the fuel tank, e.g., a change in the ethanol concentration of fuel in the tank.

Identification of a refueling event may be performed by a variety of methods and may be based on one or more sensors or triggers and/or one or more engine operating conditions. In some examples, identification of a refueling event may be based on a sensor, e.g., a pressure sensor or fuel gauge, in the fuel tank. For example, a change in pressure of the fuel in the fuel tank above a threshold value may indicate that fuel was added to the fuel tank.

In other examples, identification of a refueling event may be based on a sensor coupled to a fuel tank cap. For example, a sensor coupled to the fuel tank cap may be used to identify whether the fuel tank cap has been removed. Removal of the fuel tank cap may indicate that fuel was added to the tank.

In still other examples, identification of a refueling event may be based on a change in an air/fuel ratio of air and fuel supplied to the engine during an engine operation, e.g., based on an air/fuel sensor coupled to the engine. For example, an air/fuel ratio change by a threshold amount during engine operation may indicate that a refueling event has occurred. As another example, a first air/fuel ratio during a first operation of an engine may be compared with a second air/fuel ratio during a second operation of the engine, where the second operation is subsequent to the first operation. For example, an engine may be shut down, fuel may then be added to the fuel tank, and then the engine restarted. If the first air/fuel ratio differs from the second air/fuel ratio by a threshold amount, then a refueling event may be indicated.

If a refueling event occurs while the both the engine and the fuel reformer are in operation, the alcohol content of the new fuel may become unknown upon addition of the new fuel. As described above, the fuel reformer may not operate efficiently if the alcohol concentration of the fuel is too low. Thus the reformer may be shut down if refueling occurs while the engine is running. For example, FIG. 3, described below herein, shows a method for operating an engine during a refueling event when the engine is in operation.

If a refueling event is identified at step 202 in method 200 while the engine is not in operation, then for a first start of the engine immediately following the refueling event, the alcohol concentration of the fuel in the fuel tank may be unknown. However, for a first start of the engine immediately following the refueling event, the fuel lines may contain fuel from an engine operation preceding the refueling event. Thus, the alcohol concentration of the fuel in the fuel lines may be known until the fuel lines are replenished with the new fuel. In some examples, the fuel type, e.g., the alcohol concentration, of the fuel from an engine operation preceding the refueling event may be stored in controller 12.

The fuel left over in the fuel lines from an engine operation preceding the refueling event may be used to assist in the first start of the engine following the refueling event. For example, if the engine used a fuel substantially comprising gasoline during an engine operation preceding the refueling event, the fuel substantially comprising gasoline may still be in the fuel lines and may assist in engine starting. However, if the engine was fueled with a fuel substantially comprising alcohol during an engine operation preceding the refueling event, then reformate may be available in the reformate storage tank and/or reformate fuel lines to assist in engine starting. In some examples, when an engine is fueled with ethanol, a threshold amount of reformate may be kept in the storage tank to assist in subsequent engine starts. FIG. 4, described below herein, shows an example method for operating an engine during engine starts following a refueling event with a new fuel.

Following a refueling event identified at 200, method 200 proceeds to 204. At 204, the alcohol content of the fuel is determined. The alcohol content may be determined and/or estimated by a variety of methods and may be based on a variety of engine sensors and/or operating conditions.

In some examples, the alcohol concentration of fuel in the fuel tank may be determined by one or more model calculations based on various engine or exhaust air/fuel sensor readings. For example, the alcohol concentration of the fuel in the tank may be estimated based on a response of a fuel sensor in the fuel supply line, e.g., sensor 18, or a sensor in the fuel tank, e.g., a pressure sensor. In another example, the alcohol concentration of the fuel in the tank may be estimated based on a response of one or more air/fuel sensors in the vehicle exhaust, e.g., sensor 126. In yet another example, an engine operator may indicate the type of fuel in the fuel tank, e.g. via an onboard interface.

In some examples, determining an alcohol concentration of the fuel may be based on a plurality of estimates, e.g. taken as an average of a plurality of measurements. If a first estimate in the plurality of estimates is sufficiently different from other estimates in the plurality of estimates, e.g., if the first estimate is outside a deviation of the plurality of estimates by a threshold value, then the components used to determine the first estimate may be malfunctioning. In such a case, an indication may be sent to an engine controller to alert an operator of the engine. Monitoring various system components by comparing different estimates of fuel type are described in more detail below.

Once a stable estimate of alcohol concentration value has been determined, the decision may be made to operate the reformer. As described above, fuel reformers may not operate efficiently when supplied with fuel having an insufficient alcohol concentration, e.g., when supplied with gasoline/ethanol blends containing a low ethanol fraction. When supplied with gasoline/ethanol blends containing a low ethanol fraction a significant portion of the fuel may not be reformed by the fuel reformer and may form a condensate in the reformer and/or the reformate storage tank. Thus in some examples, if the alcohol concentration of the fuel is not sufficient, e.g., is less than a threshold value, the reformer may not be operated.

At 206, method 200 includes comparing the alcohol content of the fuel to a threshold value to determine if the alcohol concentration of the fuel is sufficient to activate the fuel reformer to produce reformate. The threshold value may depend on a variety of engine and fuel reformer operating parameters and conditions.

In some examples, the threshold may depend on the amount of condensate that can be accommodated by the engine and fuel reformer under different engine operating conditions. For example, the fuel reformer may be operated when supplied with fuel containing a low alcohol content. A significant portion of the fuel with low alcohol content may not be reformed by the fuel reformer and may form a condensate in the reformate storage tank and/or reformate fuel lines.

In some examples, the reformate storage tank may include a drain, e.g., drain line 17, to send condensate to the fuel line, e.g., fuel line 90, or back to the fuel tank. Thus, in some examples, the threshold may depend on the length of the fuel lines, the size of the reformate storage tank, the temperature and/or pressure of the storage tank, etc.

The threshold may also depend on the one or more properties of the reformer catalyst, e.g., a size of the reformer catalyst, an age of the reformer catalyst, etc. For example, reformer catalysts with a larger surface areas may reform a greater amount of alcohol fuel, thus may be able to accommodate fuels with less alcohol content to achieve acceptable levels of reformate production. In this case, for example, an increase in catalytic sites on the catalyst may allow for a decrease in the threshold. As another example, a degraded catalyst may reform a smaller amount of the alcohol fuel, thus may only accommodate fuels with higher alcohol content to achieve acceptable levels of reformate production. In this case, for example, an increase in age of the reformer catalyst may lead to an increase in the threshold.

If the alcohol content is not greater than the threshold value at 206 then the reformer is not activated and method 200 proceeds to 208.

At 208, method 200 includes determining if sufficient reformate is stored on-board the engine, e.g. in reformate storage tank 93. The amount of reformate stored may be determined based on one or more sensors in the storage tank, e.g. pressure sensor 85 and/or temperature sensor 87. For example, a threshold amount of stored reformate may be kept in a reformate storage tank for use during engine starts following refueling events.

If sufficient reformate is stored on-board the engine, method 200 proceeds to 210. At 210, method 200 includes using stored reformate sparingly during engine operation. As such, the method may include adjusting delivery of reformate to the engine based on the alcohol content of the fuel sent to the reformer. For example, stored reformate may be delivered to the engine in an amount proportional (but at a lower proportion as compared to when a greater amount of reformate is stored and/or a greater alcohol content is present) to engine knock in conjunction with spark retard and/or air charge mass limitation to reduce engine knock. By comparison, during other conditions when more reformate is stored/available or the fuel has a greater alcohol content, reformate may be delivered to the engine to abate knock without spark retard, or with relatively less spark retard. Additionally, since in this case the engine is fueled with a fuel having a low alcohol content, engine re-starts may be performed without the use of the reformate gas. As described above, in some examples, the amount of stored reformate may be maintained above a threshold value. For example, a threshold amount of reformate may be maintained for situations where the engine may be inoperable without the use of reformate, e.g., to assist in cold starts when the engine temperature is below a threshold value.

If insufficient reformate is stored onboard the engine at 208, method 200 proceeds to 212. At 212, the engine is operated with fuel provided from the fuel tank. For example, the fuel may substantially comprise gasoline or other sufficiently high octane fuels which reduce engine knock. However, various engine operating parameters may be adjusted depending on the fuel type, e.g. spark retard, compression ratio, air charge, amount of EGR, etc.

If the alcohol content of the fuel is greater than the threshold at 206, method 200 proceeds to 214. At 214, method 200 includes activating the reformer to produce reformate. Activating the reformer may include adjusting one or more operating conditions of the engine and/or reformer. For example activating the reformer may include supplying fuel flow to the reformer, e.g. via valve 16, increasing an amount of exhaust gas in thermal contact with the reformer, e.g., via bypass conduit 20, so that the temperature of the reformer increases to activate the reformer catalyst, activating the fuel reformer pump 96, etc.

At 216, method 200 includes adjusting operating conditions of the reformer based on the alcohol content of the fuel. For example, methanol may be reformed to $H_2$, $CO$, $CO_2$ with high conversion at approximately 300° C. Ethanol may be reformed to $H_2$, $CO$, $CO_2$, $CH_4$ with high conversion at temperatures below 300° C. Thus, in some examples, a temperature of the reformer catalyst may be adjusted based on the type of alcohol present in the fuel tank. For example, temperature of the reformer catalyst may be adjusted by increasing an amount of exhaust gas in thermal contact with the reformer, e.g., via bypass conduit 20, and/or by increasing an amount of heat supplied to the reformer by heater 98.

Additionally, increasing the temperature of the reformer catalyst may increase a rate of reformate production. However, high temperatures may degrade the catalyst materials in the reformer and/or various system components. Thus, adjusting operating conditions of the reformer based on the alcohol content of the fuel may include increasing a temperature of the reformer in response to a decreased alcohol content of the fuel. The temperature may be increased but remain below a threshold temperature, where the threshold temperature is a temperature at which the reformer catalyst may become degraded. For example, if the reformer is operated with a first fuel with a first alcohol content, e.g., E65, then the reformer may be operated with a first temperature. If the reformer is operated with a second fuel with a second alcohol content less than the first alcohol content, e.g., E50, then the reformer may be operated with a second temperature, where the second temperature is greater than the first temperature. The increase in temperature may at least partially compensate for the decrease in alcohol content of the fuel in order to provide sufficient reformate for delivery to the engine and/or subsequent engine operations.

Similarly, increasing a flow rate of fuel provided to the reformer may increase a rate of reformate production. Thus, adjusting operating conditions of the reformer based on the alcohol content of the fuel may include increasing a flow rate, e.g., via valve 16, of fuel provided to the reformer in response to a decreased alcohol content of the fuel. For example, if the reformer is operated with a first fuel with a first alcohol content, e.g., E65, then fuel may be injected to the reformer at a first flow rate. If the reformer is operated with a second fuel with a second alcohol content less than the first alcohol content, e.g., E50, then fuel may be injected to the reformer at a second flow rate, where the second flow rate is greater than the first flow rate. The increase in flow rate of fuel provided to the reformer may at least partially compensate for the decrease in alcohol content of the fuel in order to provide sufficient reformate for delivery to the engine and/or subsequent engine operations.

Different estimates of the alcohol content of the fuel as determined by different methods and/or system components may be used to monitor various engine and reformer system components. For example, the estimate of the alcohol content of the fuel determined in step 204 of method 200 may be a first estimate. This first estimate may be compared with other estimates if the alcohol content of the fuel after the reformer is activated in order to monitor engine and reformer system components.

For example at 218, method 200 includes determining a second estimate of the alcohol content of the fuel based on an output of the reformer. Estimating the alcohol content based on an output of the reformer may include comparing a volume of condensate (e.g., non-reformed fuel) output by the reformer to a volume of fuel supplied to the reformer. In some examples, the amount of fuel entering the reformer may be determined when the fuel is in a liquid form, e.g. via a sensor 18 in the fuel line. For example, pressure and/or temperature changes in the reformate storage tank or reformate fuel line may be used to determine the output of the reformer.

At 220, method 200 includes comparing the first estimate with the second estimate of the alcohol content of the fuel to monitor or diagnose system components. If the second estimate substantially differs from the first estimate, e.g., differs by a threshold value, then a third estimate may be made from the response of an exhaust air/fuel sensor and the closed loop fuel system, for example. A comparison of these different estimates may be used to determine if the fuel system sensor or the reformer, or other elements in the air/fuel metering system are malfunctioning.

In addition degradation identified by comparing different estimates may be reported to an engine diagnostic system so that mitigating actions may be implemented, for example. In some examples, the reformer may be deactivated if such degradation is identified and reported via one or more diagnostic codes.

FIG. 3 shows a method 300 for operating an engine during a refueling event when the engine is in operation. At 302, method 300 includes determining if refueling occurs while the engine is running. For example, a refueling event can be identified using one or more of the approaches described above with reference to step 202 in method 200. Signals from one or more engine sensors may be sent to an engine controller to determine whether fueling is taking place while the engine is running. If the engine is running while refueling occurs, method 300 proceeds to 304.

At 304, method 300 includes shutting down the reformer (if the reformer is in operation during the refueling event) until the new fuel type is established. Shutting down the reformer may include adjusting one or more operating conditions of the engine and/or reformer. For example, shutting down the reformer while the engine is running may include one or more of stopping fuel flow to the reformer, e.g. via valve 16, diverting exhaust gas away from the reformer via bypass conduit 20 so that the temperature of the reformer decreases to deactivate the reformer catalyst, shutting down the fuel reformer pump 96, turning off electric heater 98, etc. Once the fuel type is established, the fuel reformer may be activated depending on the identified fuel type. Determining the fuel type, e.g., the alcohol content of the fuel is described in detail above.

FIG. 4 shows an example method 400 for operating an engine during engine starts following a refueling event with a new fuel.

At 402, method 400 includes identifying whether an engine start is a first start of the engine immediately following a refueling event. If the answer at 402 is yes, method 400 proceeds to 404.

At 404, method 400 includes operating the engine with fuel in the fuel lines and/or stored reformate, if available. The fuel in the fuel lines may be left over from an engine operation immediately preceding the refueling event. Thus, an alcohol content of the fuel in the fuel lines may be known until the fuel lines have been replenished with the new fuel. For example, the alcohol content of the fuel in the fuel line may be stored in a memory component of the controller.

For example, if the fuel used during the engine operation immediately preceding the refueling event substantially comprised alcohol, then the reformer may have produced reformate during the engine operation immediately preceding the refueling event and reformate may be left over in the reformate fuel lines or stored in a reformate storage tank. Thus reformate left over from the previous engine operation may be used to assist in the engine start, e.g., to reduce emissions and assist in starting if the temperature is below a threshold temperature.

In another example, if the fuel used during the engine operation immediately preceding the refueling event substantially comprised gasoline, then the reformer may not have been activated to produced reformate during the engine operation immediately preceding the refueling event. Thus, in some examples, no reformate may be available to assist in the engine start, but the fuel in the fuel lines may include a sufficient amount of gasoline to assist in the start. In other examples, a threshold amount of reformate may be stored in a reformate storage tank from a previous engine operation with a fuel substantially comprising ethanol. In this case, reformate may be used in addition to the fuel in the fuel lines to assist in the engine start.

If an engine start following a refueling event is not a first start immediately following the refueling event at 402, method 400 proceeds to 406. At 406, method 400 includes determining if the engine start is a second or subsequent start following a refueling event. A second start following a refueling event may include any engine start which does not immediately follow the refueling event. During a second engine start, the fuel in the fuel lines may be replenished with the new fuel provided during the refueling event. Step 406 may also include determining if the fuel type currently in the fuel tank is known. If the fuel type currently in the tank is known at 406, method 400 proceeds to 408.

At 408, during a second start following a refueling event, the alcohol content of the fuel in the tank may be known. If the alcohol content is known then reformate may be available and may be used to assist in the second start. However, if no reformate is available, then fuel from the fuel tank may be used during the second start. However, an amount of fuel injected to the engine may be adjusted based on the alcohol content of fuel in the fuel tank and a temperature of the engine. For example, if the fuel in the fuel tank substantially comprises alcohol, then the amount of fuel injected to the engine may be increased during the second start if the temperature of the engine is below a threshold temperature.

If for a second start following a refueling event the fuel type currently in the tank is not known at 406, method 400 proceeds to 410. At 410, during a second or subsequent start following a refueling event, the alcohol content of the fuel in the tank may be unknown. In this case it may be desirable to start and/or operate the engine using a fuel whose fuel type is known. Since in this example, the alcohol content of the fuel in the tank is unknown, reformate (if available) may be used to assist in this second start. Once the engine is started, fuel from the fuel tank may be gradually introduced into the engine while the fuel type of the fuel in the fuel tank is determined. However, in some examples, reformate may not be available, for example, if the engine was operated using gasoline during previous engine operations. In this case, the engine may be operated during the second start using fuel from the fuel tank.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an engine with an alcohol reformer, comprising:
    delivering a fuel comprising alcohol to the alcohol reformer;
    reforming the fuel into a reformate gas including a $H_2$ via a catalyst in the alcohol reformer coupled to an engine exhaust passage;
    delivering the reformate gas from the alcohol reformer to an engine cylinder; and
    adjusting an amount of engine exhaust gas in thermal contact with the alcohol reformer based on an alcohol content of the fuel.

2. The method of claim 1, wherein adjusting the amount of engine exhaust gas in thermal contact with the alcohol reformer based on the alcohol content of the fuel includes increasing the amount of engine exhaust gas in thermal contact with the alcohol reformer with decreasing alcohol content of the fuel.

3. The method of claim 1, wherein the alcohol content of the fuel is determined based on readings from a sensor in a fuel supply line.

4. The method of claim 1, wherein the alcohol content of the fuel is determined based on readings from a sensor in an exhaust of the engine.

5. The method of claim 1, wherein the alcohol content of the fuel is estimated based on an amount of reformate output by the reformer, wherein the amount of reformate output by the reformer is determined by pressure and/or temperature changes in a reformate storage tank or reformate fuel line.

6. The method of claim 1, further comprising monitoring the reformer by comparing a first estimate of the alcohol content of the fuel with a second estimate of the alcohol content of the fuel, identifying reformer degradation based on the comparison, and reporting reformer degradation to an engine diagnostic system.

7. A method for operating an engine with an alcohol Reformer which reforms a fuel comprising alcohol into a reformate including $H_2$, comprising:
    delivering a fuel comprising alcohol to the alcohol reformer;
    activating the alcohol reformer to produce reformate gas, including $H_2$, from the fuel, via endothermic dehydrogenation of alcohol as it passes through a catalyst in the reformer, based on an alcohol content of the fuel;
    delivering the reformate gas to a cylinder of the engine;
    adjusting an operating condition of the alcohol reformer based on an alcohol content of the fuel; and
    deactivating the alcohol reformer if a refueling event occurs while the engine is running.

8. The method of claim 7, wherein activating the reformer to produce reformate gas based on an alcohol content of the fuel follows a refueling event, where the refueling event includes refilling the engine with fuel, and wherein an alcohol content of the fuel varies with refilling.

9. The method of claim 7, further comprising during an engine start immediately following a refueling event, operating the engine using reformate, if available, produced during a previous engine operation.

10. The method of claim 7 wherein deactivating the alcohol reformer if a refueling event occurs while the engine is running includes diverting exhaust gas away from the alcohol reformer via a bypass conduit, and adjusting delivery of reformate gas to the engine based on the alcohol content of the fuel, including increasing a relative amount of reformate delivered to the engine when the alcohol content of the fuel is greater, and decreasing the relative amount of reformate delivered to the engine when the alcohol content of the fuel is lower.

11. The method of claim 7, wherein activating the reformer includes supplying the fuel to the reformer, and wherein adjusting the flow rate of fuel supplied to the alcohol reformer based on an alcohol content of the fuel includes increasing the flow rate of fuel supplied to the reformer with decreasing alcohol content.

12. The method of claim 7, further comprising increasing a temperature of the reformer with decreasing alcohol content of the fuel, wherein increasing the temperature of the reformer includes increasing an amount of engine exhaust gas in thermal contact with the reformer.

13. The method of claim 7, further comprising, if the reformer outputs non-reformed fuel, sending the non-reformed fuel to a fuel injection system of the engine.

14. The method of claim 7, further comprising, if the reformer outputs non-reformed fuel, sending the non-reformed fuel to a fuel tank.

15. The method of claim 7, wherein adjusting an operating condition of the alcohol reformer based on an alcohol content of the fuel includes increasing a flow rate of fuel supplied to the reformer with decreasing alcohol content of the fuel, the method further comprising adjusting delivery of reformate to the engine based on the alcohol content of the fuel, and delivering the fuel from a fuel tank to a fuel injector coupled to the cylinder of the engine.

16. A method for operating an engine, comprising:
delivering a fuel comprising alcohol to the alcohol reformer;
reforming the fuel into a reformate gas, including a $H_2$, when an alcohol content of the fuel is above a threshold, the reforming comprising driving an endothermic dehydrogenation of alcohol via exhaust heat as it passes through a reformer catalyst;
not reforming a fuel into a reformate gas, including $H_2$, when an alcohol content of the fuel is below the threshold; and
not reforming the fuel into a reformate gas, including $H_2$, if a refueling event occurs while the engine is running.

17. The method of claim 16, further comprising storing a portion of reformate gas in a reformate storage tank when the alcohol content of the fuel is above the threshold, and operating the engine with fuel from a fuel tank when the alcohol content is below the threshold, wherein the threshold depends on one or more properties of the reformer catalyst, the properties of the reformer catalyst including surface area and age.

18. The method of claim 17, further comprising operating the engine with reformate gas from the reformate storage tank, if available, and delivering ethanol via a fuel line to the reformer, and via a fuel injector to the engine, where the fuel injector is separate from the fuel line.

19. The method of claim 16, where not reforming the fuel into a reformate gas includes diverting exhaust gas away from the alcohol reformer via a bypass conduit.

20. The method of claim 16 further comprising, when the alcohol content of the fuel is above the threshold, adjusting the temperature of the alcohol reformer based on the alcohol content of the fuel by adjusting a temperature of fuel supplied to the reformer, where the temperature of fuel supplied to the reformer is increased by increasing power to a heater coupled to the reformer.

* * * * *